United States Patent Office 3,231,330
Patented Jan. 25, 1966

3,231,330
PREPARATION OF NORDSTRANDITE
Ulrich Hauschild, Hannover, Germany, assignor to Kali-Chemie Aktiengesellschaft, Hannover, Germany
No Drawing. Filed Feb. 18, 1963, Ser. No. 259,393
Claims priority, application Germany, Feb. 20, 1962,
K 45,949
7 Claims. (Cl. 23—143)

This invention relates to the preparation of nordstrandite, which is a well-defined modification of aluminum trihydroxide.

Alumina has been used for a long time in form of various modifications. Particularly, the so-called active forms of alumina have found many applications, which often require highest purity and homogenity.

In contrast to thermally stable alpha-aluminum oxide, the active aluminum oxide modifications still contain OH groups. For their preparation, the generally used starting material is one of the known pure modifications of aluminum hydroxide which is dehydrated by heating at a certain temperature. Depending on the particular aluminum hydroxide modification used, structurally different oxide modifications are formed.

Bayerite and hydrargillite, also called gibbsite, are $Al(OH)_3$ modifications which have been known for a long time. Very recently, Van Nordstrand, Hettinger and Keith (Nature, vol. 177, p. 713) have described a a third $Al(OH)_3$ modification which has become known under the names of randomite, bayerite II, or nordstrandite, which last name will be used throughout the application and claims. Nordstrandite has gained considerable importance for use as a catalyst.

In my copending application Ser. No. 211,112, filed July 19, 1962, I have disclosed a method for the preparation of nordstrandite by reacting finely divided metallic aluminum with aqueous solutions of alkylene diamines at temperatures below 80° C. As the use of pure metallic aluminum as starting material is expensive, a method to prepare nordstrandite from readily available aluminum hydroxide gels would be much more economic. However, heretofore, it had not been possible to prepare from aluminum hydroxide gels pure nordstrandite. In said known methods, gels prepared from dilute aqueous aluminum salt solutions by means by ammonium hydroxide or sodium carbonate solutions were aged for a prolonged time at pH values of 7.5 to 13. In this way, impure and unhomogeneous products were obtained which were always mixtures of nordstrandite, bayerite, boehmite, and hydrargillite and contained, in addition, mostly a considerable amount of amorphous substance. Even under optimum conditions, only samples enriched in nordstrandite could be recovered. Neither did a treatment of aluminum hydroxide gels with solutions of hydrazine produce essentially better products. Therefore, it could be assumed that, using aluminum hydroxide gels as starting material, nordstrandite could be obtained only in combination with bayerite or other hydroxide modifications.

It is, therefore, a principal object of the invention to provide a method for preparing from aluminum hydroxide gels a nordstrandite which is free of other $Al(OH)_3$ modifications.

Other objects and advantages will be apparent from a consideration of the specification and claims.

I have found that aluminum hydroxide gel can be converted in a simple manner to pure nordstrandite, which is free of any other known aluminum hydroxides, by aging the aluminum hydroxide gel at a temperature below about 80° C. in the presence of alkylene diamines in an aqueous medium. The obtained precipitate is then filtered off and dried.

A particularly suitable alkylene diamine is ethylene diamine which is readily miscible with water in any proportions. Also the other lower alkylene diamines, such as dl-propylene diamine, are suitable due to their relatively good reactivity. The long chain alkylene diamines, which are only slightly soluble in water, are less suitable.

As the alkylene diamines act substantially as specific catalysts, their concentration in the aqueous solutions used need not be high. Generally, alkylene diamine concentrations below 35 percent by weight are sufficient. It is, of course, also possible to operate with higher concentrated solutions; thereby, however, is the risk of unnecessary losses of alkylene diamines. I prefer to use solutions which have an alkylene diamine concentration of 0.1 to 25 percent by weight.

The process can be carried out at temperatures between 0 and 80° C., preferably from 40 to 70° C. While the rate of conversion is low at lower temperatures, the conversion to nordstrandite falls off considerably at temperatures above 80° C. and by-products are formed in increasing amounts.

Any aluminum hydroxide gel can be used as starting material. For instance, aluminum hydroxide gels may be employed which are precipitated from solutions of aluminum sulfate, nitrate, or chloride by addition of dilute sodium carbonate, ammonium hydroxide, or sodium hydroxide solutions to a pH value of 7 to 8.5 and have been washed with water until substantial removal of the respective ions. Such aluminum hydroxide gels are then introduced into an alkylene diamine solution and suspended therein. Instead of aluminum hydroxide gels prepared as recited above, gels may be used which were prepared by less conventional methods, for instance by hydrolysis of aluminum alcoholates. For instance, a very pure product is obtained when an aluminum alcoholate is treated directly with an aqueous solution of alkylene diamine at a temperature below 80° C., whereby the aluminum hydroxide formed by hydrolysis is converted by the specific effect of the alkylene diamine to nordstrandite.

The ratio of alkylene diamine solution to aluminum hydroxide gel may vary within wide limits. If excessive amounts of liquid shall be avoided, a high concentrated, e.g. 80%, alkylene diamine solution is added to the gel in such an amount that a suspension containing 0.1 to 25 percent by weight of alkylene diamine is obtained. Generally, the ratio of alkylene diamine solution to aluminum hydroxide gel should be within the range of 0.01:1 to 10:1. The pH value of the solution is of minor importance.

After the conversion of the aluminum hydroxide gel to nordstrandite has been terminated, the latter is filtered off, washed with water, and dried at elevated temperature. Instead of such conventional procedure, the washed product may be dried by other means, for instance by displacing the water by alcohol, acetone, or the like and by drying subsequently at room or slightly elevated temperature. The filtrate which contains the alkylene diamine, will be reused for following batches. Only rarely a discoloration of the solution will be observed, particularly when the process is carried out at elevated temperatures or with higher alkylene diamine concentrations, or when an aluminum hydroxide gel is used which had been obtained at a higher pH value. If, after some time, the proportion of foreign ions in the solution has increased too much and, in addition, the amine content has decreased below a certain point, the solution may be discarded or the amine recovered by distillation. Also a purification with ion exchangers or combination of several known procedures may be applied.

It is very likely that, under the action of an alkylene diamine, the starting aluminum hydroxide gel is converted first to the monohydrate in the form of poorly crystallized boehmite or pseudoboehmite which then is catalytically transformed with addition of water into the nordstrandite. The rate of conversion depends on various factors, for instance the aging temperature, the concentration of the alkylene diamine, and the method used for the preparation of the aluminum hydroxide gel. In each case, X-ray analysis will show whether or not the product is pure nordstrandite.

The nordstrandite prepared according to the invention does not contain any hydrargillite or bayerite nor practically any other metal ions. Depending on the purity of the starting materials and on the washing of the aluminum hydroxide gel, the products are more or less free of anions. If the employed alkylene diamine solutions have a concentration below 20 percent, the nitrogen content of the obtained nordstrandite is well below 0.1%, and substantially no nitrogen can be found if solutions of less than 10% alkylene diamine are used.

Due to its ready peptizability by dilute aqueous acids, unconverted boehmite is easily dissolved and removed by a short treatment with acids such as hydrochloric acid, formic acid, or acetic acid. At normal temperature, nordstrandite itself is quite stable against such dilute acids.

The obtained nordstrandite may be used directly, or indirectly in form of active alumina prepared therefrom by heating, as catalyst or as support for catalysts. By addition of the respective salts, metal hydroxides or oxides, prior to, during or after the aging process, the end product may be provided with the respective cation and/or anions. In addition, the nordstrandite itself, or the active alumina obtained therefrom at elevated temperatures, may be used as drying agent or for other purposes.

The following examples are given to illustrate the invention.

*Example 1*

75 g. of $Al_2(SO_4)_3 \cdot 18H_2O$ were dissolved in 500 ml. of water and neutralized at room temperature with 10% caustic soda solution to a pH value of 8. The obtained gel was washed several times with water. The centrifuged moist aluminum hydroxide gel was suspended in 500 ml. of a 10% aqueous ethylenediamine solution and was allowed to stand therein for 4 days at a temperature of 55° C., with occasional stirring. The obtained crystalline aluminum hydroxide was filtered, washed, and dried at 100° C. It consisted of pure nordstrandite without any hydrargillite and bayerite.

*Example 2*

An aqueous solution of aluminum nitrate was treated with a 10% sodium carbonate solution to a pH value of 7.5 for precipitation of an aluminum hydroxide gel which was washed repeatedly with water to remove substantially the alkali. 30 g. of the moist centrifuged product were then suspended in 100 ml. of a 10% aqueous propylenediamine solution and aged for 25 days at a temperature of 40° C. The product was then filtered, washed with water, and dried at 100° C.; X-ray analysis could not detect any hydroxides other than nordstrandite.

*Example 3*

A 5% ammonium hydroxide solution was added to an aluminum chloride solution in an amount sufficient to raise the pH value to 7.2. The gelatinous precipitate was washed repeatedly with water and centrifuged, and 10 g. of such precipitate were then suspended in 100 ml. of an 0.2% ethylene diamine solution and allowed to stand at a temperature of 65° C. for 20 days. The obtained product consisted of pure nordstrandite.

*Example 4*

100 g. of an aluminum hydroxide gel prepared as described in Example 2 were stirred into 100 ml. of a 25% ethylenediamine solution. The batch was kept for 2 days at the conversion temperature of 50° C., and then the precipitate was filtered and washed. The X-ray analysis showed that the product contained, in addition to nordstrandite, a small proportion of poorly crystallized boehmite or pseudoboehmite. In order to remove said boehmite, the still moist sample was slurried in 500 ml. of a n/50 hydrochloric acid solution and stirred for half an hour. After filtering, washing, and drying, the thus obtained nordstrandite contained only negligible amounts of boehmite.

*Example 5*

Aluminum hydroxide gel, prepared from an aluminum chloride and sodium carbonate solution at a pH of 7.8 and washed, was suspended in a ratio of 1:5 in a 10% ethylenediamine solution and heated to 70° C. After a heating time of 20 hours, an X-ray diagram of the product showed no other aluminum hydroxide modifications besides nordstrandite.

*Example 6*

50 ml. of a 80% ethylenediamine solution were added to 500 ml. of an aluminum hydroxide gel and the batch was thoroughly mixed by vigorous agitation. After the gel had been allowed to stand for 3 days at 60° C., it had been completely converted to nordstandite.

*Example 7*

100 g. of freshly distilled aluminum ethylate were intimately ground with 120 ml. of an 80% ethylenediamine solution, whereby a transparent paste was formed. The paste was transferred into a polyethylene vessel and diluted with water to 930 ml. Subsequently, the batch was shaken in the sealed vessel for 2 hours at room temperature. For conversion to nordstrandite, the suspension was allowed to stand in the sealed vessel for 46 days at 50° C. and was shaken from time to time. Then the precipitate was filtered, washed with water and alcohol, and dried at 140° C. There were obtained 48.15 g. of pure nordstrandite.

I claim:

1. A process for the preparation of the $Al(OH)_3$ modification nordstrandite free of other $Al(OH)_3$ modifications comprising ageing an aluminum hydroxide gel with an aqueous solution of an alkylenediamine selected from the group consisting of ethylenediamine and propylenediamine at a temperature in the range of 0° to 80° C., filtering, and drying the filtered product.

2. A process as claimed in claim 1 wherein the concentration of the alkylenediamine in the aqueous phase is below 35 percent by weight.

3. A process as claimed in claim 2 wherein the concentration of the alkylenediamine in the aqueous phase is 0.1 to 25 percent by weight.

4. A process as claimed in claim 1 wherein the treatment is carried out at a temperature of 40 to 70° C.

5. A process as claimed in claim 1 comprising treating the filtered product with a dilute aqueous acid selected from the group consisting of hydrochloric acid, formic acid, and acetic acid.

6. A process for the preparation of the $Al(OH)_3$ modification nordstrandite free of other $Al(OH)_3$ modifications comprising reacting an aluminum alcoholate with an aqueous solution of an alkylenediamine selected from the group consisting of ethylenediamine and propylenediamine at a temperature of 0° to 80° C., thereby converting the aluminum hydroxide precipitate formed by hydrolysis to nordstrandite, filtering said precipitate, and drying the same.

7. A process for the preparation of the $Al(OH)_3$ modification nordstrandite free of other $Al(OH)_3$ modifications comprising ageing an aluminum hydroxide gel with an aqueous solution of an alkylenediamine selected from the group consisting of ethylenediamine and propylenediamine at a temperature in the range of 0° to 80° C. until the aluminum hydroxide has been substantially completely converted to nordstrandite, filtering, and drying the filtered product.

References Cited by the Examiner

UNITED STATES PATENTS

| | | | |
|---|---|---|---|
| 2,733,219 | 1/1956 | Block | 23—143 X |
| 2,804,433 | 8/1957 | Hervert et al. | 23—143 X |
| 2,958,581 | 11/1960 | Hervert et al. | 23—143 |
| 3,058,907 | 10/1962 | Van Nordstrand et al. | 23—143 X |

BENJAMIN HENKIN, *Primary Examiner.*

MAURICE A. BRINDISI, *Examiner.*

H. T. CARTER, *Assistant Examiner.*